US009645740B2

(12) United States Patent
Fischer-Toubol et al.

(10) Patent No.: US 9,645,740 B2
(45) Date of Patent: *May 9, 2017

(54) SELF-DETECTING STORAGE BOTTLENECK WHILE HANDLING SEQUENTIAL I/O OPERATIONS

(71) Applicant: INTERNATIONAL BUSINESS MACHINES CORPORATION, Armonk, NY (US)

(72) Inventors: Jonathan Fischer-Toubol, Tel Aviv (IL); Omer Haklay, Shoham (IL); Nir Milstein, Tel Aviv (IL); Ori Shalev, Kiryat Ono (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,657

(22) Filed: May 14, 2015

(65) Prior Publication Data
US 2015/0248243 A1 Sep. 3, 2015

Related U.S. Application Data

(63) Continuation of application No. 13/859,108, filed on Apr. 9, 2013, now Pat. No. 9,063,669.

(51) Int. Cl.
*G06F 3/00* (2006.01)
*G06F 15/173* (2006.01)
*G06F 3/06* (2006.01)
*G06F 12/0866* (2016.01)
*G06F 11/34* (2006.01)

(52) U.S. Cl.
CPC ............ *G06F 3/0608* (2013.01); *G06F 3/067* (2013.01); *G06F 3/0614* (2013.01); *G06F 3/0635* (2013.01); *G06F 3/0659* (2013.01); *G06F 3/0689* (2013.01); *G06F 11/3419* (2013.01); *G06F 11/3485* (2013.01); *G06F 12/0866* (2013.01); *G06F 3/0638* (2013.01)

(58) Field of Classification Search
None
See application file for complete search history.

(56) References Cited

U.S. PATENT DOCUMENTS

| 6,393,480 B1* | 5/2002 | Qin ..................... G06F 11/3419 703/19 |
| 6,950,914 B2 | 9/2005 | Iwami et al. |
| 7,130,915 B1* | 10/2006 | Rustad .................. H04L 41/147 370/229 |
| 7,457,931 B1* | 11/2008 | Fedorova ............ G06F 11/3419 711/118 |

(Continued)

FOREIGN PATENT DOCUMENTS

| CN | 101616174 A | 12/2009 |
| CN | 102404399 A | 4/2012 |

*Primary Examiner* — Michael Sun
(74) *Attorney, Agent, or Firm* — Griffiths & Seaton PLLC

(57) ABSTRACT

Delay commands are injected into sequential input/output (I/O) requests and the effects of the injected delay commands are measured for determining whether a storage system handling the sequential input/output (IO) requests is causing a bottleneck, while the processing of sequential I/O requests is delayed for a time period when injecting the delay command.

24 Claims, 9 Drawing Sheets

(56) References Cited

U.S. PATENT DOCUMENTS

| | | | |
|---|---|---|---|
| 7,551,621 B1* | 6/2009 | Hedge | H04L 47/10 370/235 |
| 2002/0163932 A1 | 11/2002 | Fischer et al. | |
| 2003/0236938 A1* | 12/2003 | Bennett | H04L 12/2697 710/305 |
| 2006/0067233 A1* | 3/2006 | Fukuda | H04L 12/5601 370/235.1 |
| 2007/0002897 A1* | 1/2007 | Goshen | H04L 29/06027 370/468 |
| 2007/0277232 A1* | 11/2007 | Cates | H04L 63/061 726/6 |
| 2009/0089619 A1 | 4/2009 | Huang et al. | |
| 2009/0172687 A1* | 7/2009 | Bobak | G06Q 10/06 8/104 |
| 2009/0216910 A1 | 8/2009 | Duchesneau | |
| 2009/0319816 A1* | 12/2009 | Watanabe | G06F 1/14 713/401 |
| 2010/0082300 A1* | 4/2010 | Hollingsworth | G06F 3/0605 702/186 |
| 2011/0173637 A1* | 7/2011 | Brandwine | G06F 9/5072 719/314 |

\* cited by examiner

SELF-DETECTING STORAGE BOTTLENECK WHILE HANDLING SEQUENTIAL I/O OPERATIONS

CROSS-REFERENCE TO RELATED APPLICATIONS

This Application is a Continuation of U.S. patent application Ser. No. 13/859,108, filed on Apr. 9, 2013, now U.S. Patent No. 9,063,669.

BACKGROUND OF THE INVENTION

Field of the Invention

The present invention relates generally to computers, and more particularly to self-detecting storage bottleneck while handling sequential I/O operations in a computing environment.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. One of the most noticeable changes introduced by recent computer technology is the inclusion of images, video, and audio to enhance the capabilities of computers and electronic appliances. In the age of multimedia, the amount of information to be processed increases greatly. One popular method of handling large data files is to compress the data for storage or transmission. Processing very large amounts of information is a key problem to solve, and therefore, a need exists to improve the compression of data for storage or transmission.

SUMMARY OF THE DESCRIBED EMBODIMENTS

Accordingly, and in view of the foregoing, various exemplary method, system, and computer program product embodiments for self-detecting storage bottleneck while handling sequential I/O operations using at least one processor device are provided. In one embodiment, a method is provided for self-detecting storage bottleneck while handling sequential I/O operations using a processor device in a computing environment. In one embodiment, by way of example only, delay commands are injected into sequential input/output (I/O) requests and the effects of the injected delay commands are measured for determining whether a storage system handling the sequential input/output (IO) requests is causing a bottleneck, while the processing of sequential I/O requests is delayed for a time period when injecting the delay command.

In another embodiment, a computer system is provided for self-detecting storage bottleneck while handling sequential I/O operations using a processor device in a computing environment. The computer system includes a computer-readable medium and a processor in operable communication with the computer-readable medium. In one embodiment, by way of example only, using at least one processor device, delay commands are injected into sequential input/output (I/O) requests and the effects of the injected delay commands are measured for determining whether a storage system handling the sequential input/output (IO) requests is causing a bottleneck, while the processing of sequential I/O requests is delayed for a time period when injecting the delay command.

In a further embodiment, a computer program product is provided for self-detecting storage bottleneck while handling sequential I/O operations by a processor device in a computing environment. The computer-readable storage medium has computer-readable program code portions stored thereon. The computer-readable program code portions include a first executable portion delays commands are injected into sequential input/output (I/O) requests and the effects of the injected delay commands are measured for determining whether a storage system handling the sequential input/output (IO) requests is causing a bottleneck, while the processing of sequential I/O requests is delayed for a time period when injecting the delay command.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
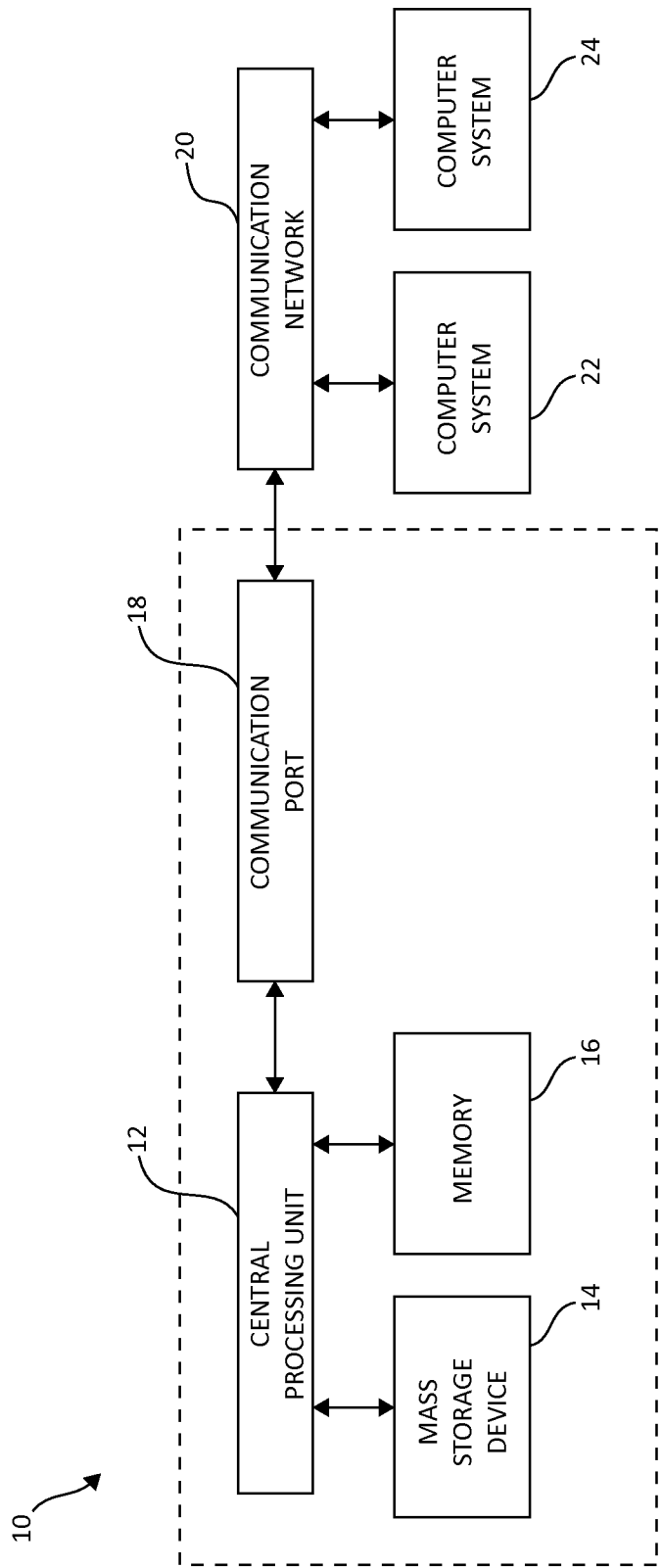
FIG. 1 illustrates a computer storage environment having an example storage device in which aspects of the present invention may be realized.

With increasing demand for faster, more powerful and more efficient ways to store information, optimization of storage technologies is becoming a key challenge. Logical data objects (data files, image files, data blocks, etc.) may be compressed for transmission and/or storage. Data compression techniques are used to reduce the amount of data to be stored and/or transmitted in order to reduce the storage capacity and/or transmission time respectively. Compression may be achieved by using different compression algorithms, for example, by sequential data compression, which takes a stream of data as an input and generates a usually shorter stream of output from which the original data can be restored.

In one embodiment, a storage system may serve client applications performing input/output (I/O) operations such as reading and writing data into specified locations (offsets) in a physical and/or virtual block device. An asynchronous I/O operation is invoked with a request sent to the storage component and completed with a response received from the storage system component. For reading and writing large consecutive segments of data, storage client applications often issue sequential IO requests, that is, one request's starting offset is another one's ending offset.

However, a need exists for a storage system to determine whether the storage system itself is a bottleneck of a client's I/O execution. By determining whether the storage system itself is a bottleneck of a client's I/O execution, the storage system could temporarily boost performance by deferring the heavy tasks such as compression. Detecting situations where the storage is being a bottleneck cannot be done by mere examination. As such, some interference is required.

Accordingly, and in view of the foregoing, various exemplary method, system, and computer program product embodiments for self-detecting storage bottleneck while handling sequential I/O operations using at least one processor device are provided. In one embodiment, a method is provided for self-detecting storage bottleneck while handling sequential I/O operations using a processor device in a computing environment. In one embodiment, by way of example only, delay commands and/or delay patterns are injected into sequential input/output (I/O) requests and the effects of the injected delay commands are measured for determining whether a storage system handling the sequential input/output (IO) requests is causing a bottleneck.

It should be noted that as used herein, the present invention may be applied to cache as well as storage devices. As such, at least one cache device may be used in place of any reference to a storage system and/or storage device.

Also, a cache module may support two alternative eviction mechanisms that are different in their latency. When the cache is full, new elements must wait for old ones to evict. Selecting the faster eviction mechanism for specific I/Os detected as blocking the user is analogous to selecting the faster alternative described herein. Even more specifically, a cache module may include a special area that is reserved for "quick eviction" of elements that are blocking new elements generated by a blocked user. Selecting to evict the right elements to the special area (and only later to disk) will improve latency of the latency-sensitive IOs. In one embodiment, quick eviction and normal eviction are analogous to "defer compression" and "don't defer compression". In both cases there are two methods, one is faster than the other. When detecting that the storage side is the bottleneck, it is advantageous and wiser to choose the faster one. Injecting the delays is just the detection technique. In one embodiment, the "injected delays" may be positive and/or negative for boosting the processing of a pattern of I/Os rather than delay the pattern.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
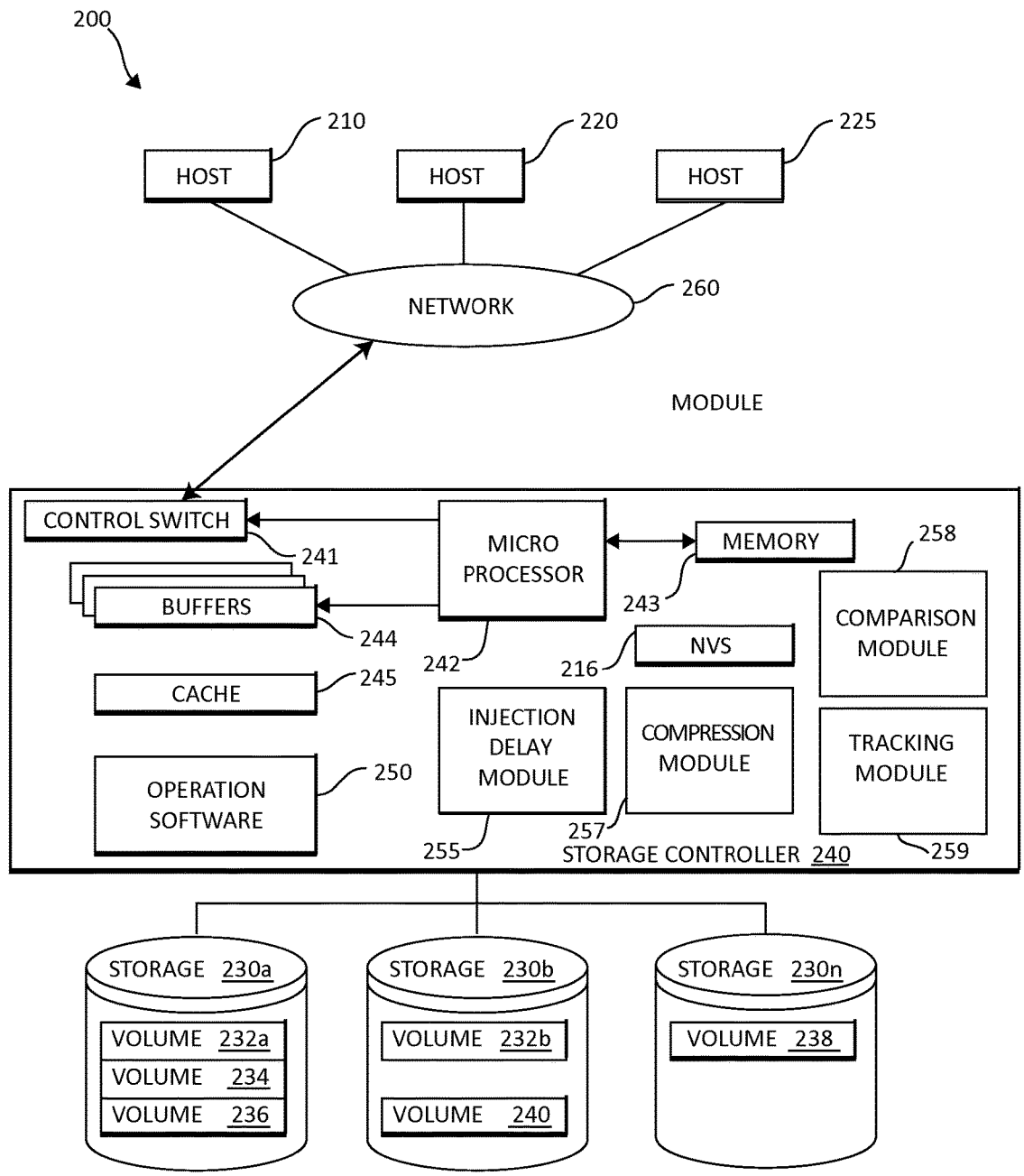
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computer storage environment. In one embodiment, system memory 243 includes, is associated, or is in communication with the operation software 250 in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a.

Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an injection delay module 255, a compression module 257, a comparison module (e.g., delay pattern/command matching module) 258, and a tracking module 259 in a computer storage environment. The injection delay module 255, the compression module 257, the comparison module (e.g., delay pattern/command matching module) 258, and the tracking module 259 may work in conjunction with each and every component of the storage controller 240, the hosts 210, 220, 225, and storage devices 230. The injection delay module 255, the compression module 257, the comparison module (e.g., delay pattern/command matching module) 258, and the tracking module 259 may be structurally one complete module working together and in conjunction with each other for performing such functionality as described below, or may be individual modules. The injection delay module 255, the compression module 257, the comparison module (e.g., delay pattern/command matching module) 258, and the tracking module 259 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, injection delay module 255, the compression module 257, the comparison module (e.g., delay pattern/command matching module) 258, and the tracking module 259 on which information may be set. Multiple buffers 244 may be implemented with the present invention in a computing environment, or performing other functionality in accordance with the mechanisms of the illustrated embodiments.

In one embodiment, by way of example only, the host computers or one or more physical or virtual devices, 210, 220, 225 and the storage controller 240 are connected through a network adaptor (this could be a fiber channel) 260 as an interface i.e., via a switch sometimes referred to as "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, injection delay module 255, the compression module 257, the comparison module (e.g., delay pattern/command matching module) 258, and the tracking module 259 are in communication with each other and may be separate or one individual component(s). Also, several, if not all of the components, such as the operation software 245 may be included with the memory 243 in a computer storage environment. Each of the components within the storage device may be linked together and may be in communication with each other for purposes suited to the present invention.

Figure 3:
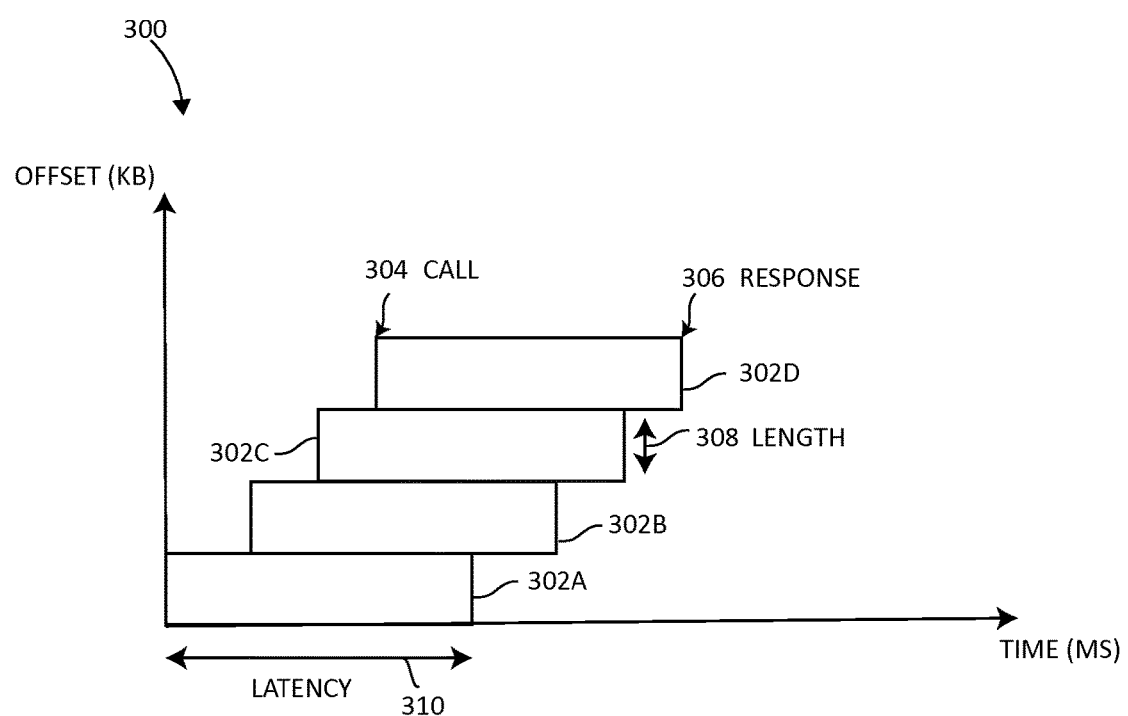
FIG. 3 illustrates an exemplary block diagram of a set of parallel sequential input/output (I/O) requests in which aspects of the present invention may be realized.

FIG. 3 illustrates an exemplary block diagram 300 of a set parallel sequential input/output (I/O) requests in which aspects of the present invention may be realized. To achieve high throughput, storage client applications may be issued as a set of parallel sequential input/output (I/O) requests 302 (shown in FIG. 3 as 302A-D) in parallel. The call 304 of the request 302 is displayed with the latency 310 of the request 302 shown prior to the response 306 of the request 302. Also, the lengths 308 of each of the requests 302 are also displayed. The specified locations (offsets shown in kilobytes) of the requests 302 are illustrated on the Y-axis and the time (e.g., milliseconds) of execution of the requests 302 shown on the X-axis.

Figure 4:
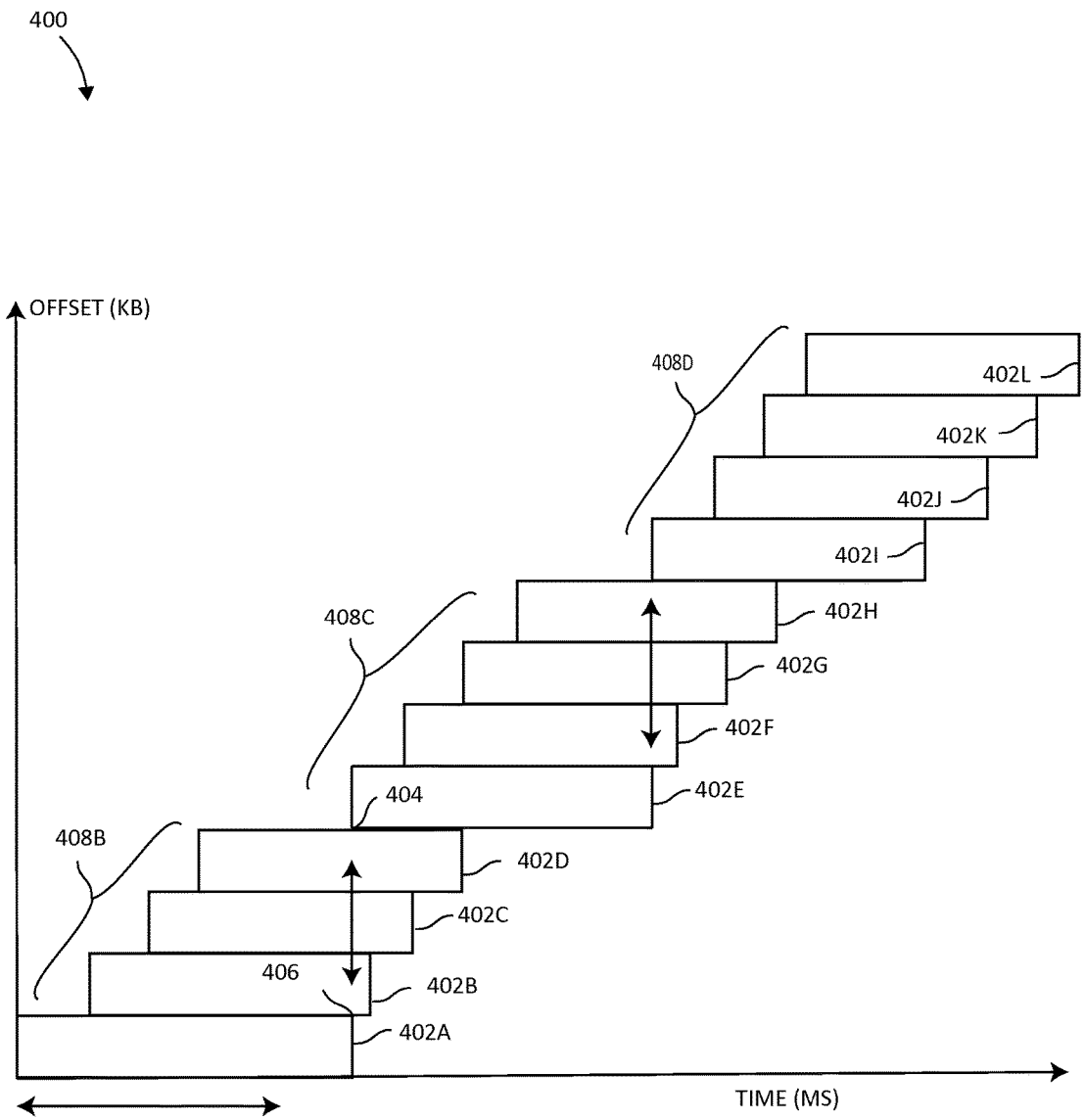
FIG. 4 illustrates an exemplary block diagram of multiple sets of parallel sequential input/output (I/O) requests in which aspects of the present invention may be realized.

Turning, now to FIG. 4, an exemplary block diagram 400 of multiple sets of parallel sequential input/output (I/O) requests, in which aspects of the present invention may be realized, is illustrated. The specified locations (offsets shown in kilobytes) of the requests 402 are illustrated on the Y-axis and the time (e.g., milliseconds) of execution of the requests 402 shown on the X-axis. FIG. 4 illustrates a set of parallel operations 408 (shown in FIG. 4 as 408A-C). The set 408 of the parallel requests 402 (shown in FIG. 4 as 402A-L) may be limited in size for various reasons, so after issuing the first set 408A of the parallel requests 402 (e.g., requests 402A-D), a client must wait for requests 402 to complete before sending additional requests 402 (e.g., the call 404 of request 402E is waiting for the response 406 of the request 402A prior to being sent; an arrow is shown between the call 404 and the response 406).

Figure 5:
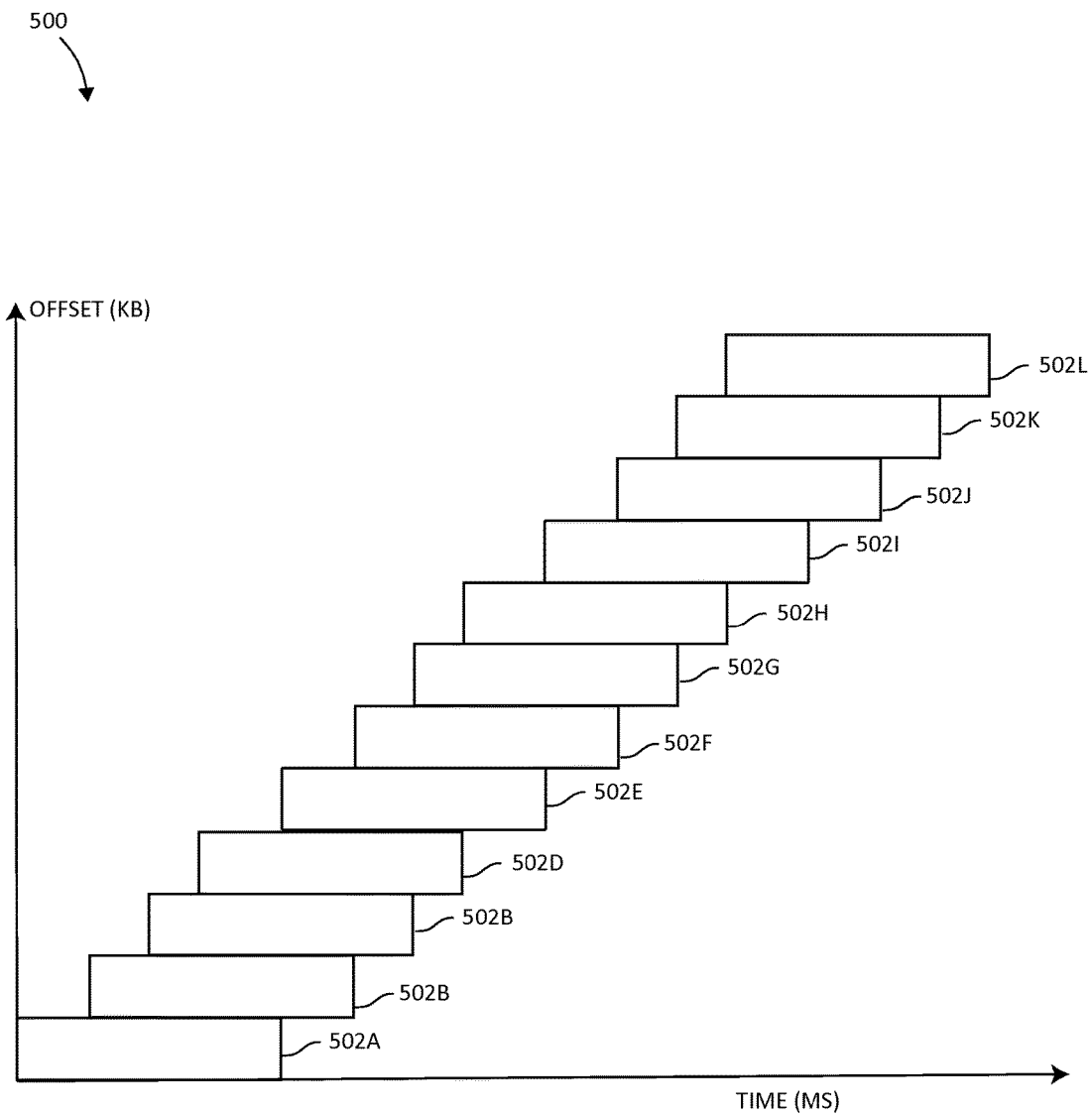
FIG. 5 illustrates an exemplary block diagram of execution of asynchronous sequential operations in which aspects of the present invention may be realized.

Turning now to FIG. 5 an exemplary block diagram 500 for execution of asynchronous sequential operations requests, in which aspects of the present invention may be realized, is illustrated. In operation, as shown in FIG. 5, during a long execution of sequential operations of the parallel requests 502 (shown in FIG. 5 as 502A-L), the behavior of the storage system converges to uniformly distributed execution of asynchronous operations. In this state, from the perspective of the storage system, it is unclear whether the storage system component is in the critical path of the client's application (e.g., causing a bottleneck). This is because it may seem like the client is issuing requests at some given rate. As seen in FIG. 5, the specified locations (offsets shown in kilobytes) of the requests 502 are illustrated on the Y-axis and the time (e.g., milliseconds) of execution of the requests 502 shown on the X-axis.

Since a storage system may serve multiple clients and applications in parallel, from the storage side, it is extremely difficult for the storage system to track a sequence of I/O operations originated from a specific execution of a client application. However, applications performing sequential I/Os are easy to track by the sequences of consecutive offsets they are accessing. In this way, the present invention may track sequences of a subset of the clients' executions in a seemingly intensive and arbitrary mix of I/O requests being processed. As such, the space dimension of the computing system is utilized.

Moreover, a storage system may have more than one alternative for handling I/O operations. For example, a storage system supporting self-detecting storage bottleneck while handling sequential I/O operations may prefer to defer the compression of data rather than immediately store the data in a persistent storage medium. In situations where compression resources, such as the central processing unit (CPU), power is short, if the client application performance suffers from the reduced storage throughput, it may be wiser to store the noncompressed data and do the compression later, when things get calmer, thereby deferring heavy processing of I/Os. However, the present invention provides increased efficiency by determining, by the storage system, whether the storage system itself is a bottleneck of a client's I/O execution. Thus, the storage system may temporarily boost performance by deferring the heavy tasks such as compression. Detecting situations where the storage is being a bottleneck cannot be done by mere examination. As such, some interference is required.

Figure 6:
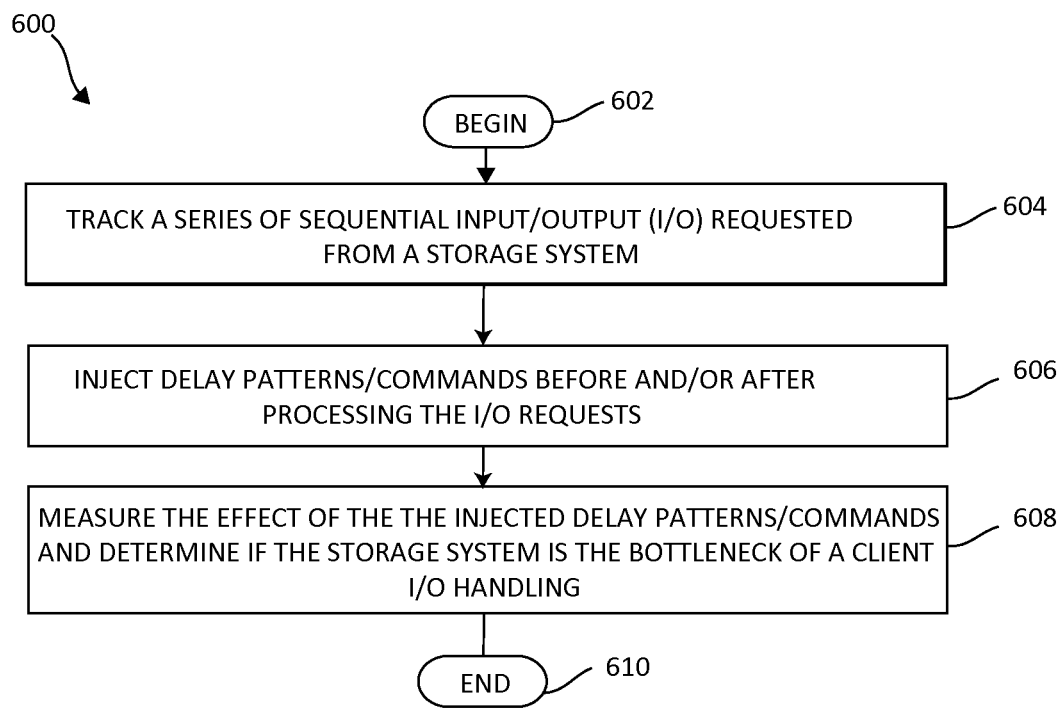
FIG. 6 is a flowchart illustrating an exemplary method for injecting delay commands into parallel sequential input/output (I/O) requests in which aspects of the present invention may be realized.

Accordingly, in one embodiment, the present invention provides a solution for self-detecting storage bottleneck while handling sequential I/O operations using at least one processor device. In one embodiment, by way of example only, delay commands and/or delay patterns are injected into sequential input/output (I/O) requests and the effects of the injected delay commands are measured for determining whether a storage system handling the sequential input/output (IO) requests is causing a bottleneck. In one embodiment, the delay should be in the same order of magnitude of other parameters, such as latency. For example, if the latency of handling an IO request is 8 ms, we may choose to delay it by 1 ms, 2 ms, or even 10 ms. This is more clearly illustrated in FIG. 6. FIG. 6 is a flowchart illustrating an exemplary method 600 for injecting delay commands into sequential input/output (I/O) requests in which aspects of the present invention may be realized. The method 600 beings (step 602) by tracking a series of sequential I/O requests (e.g., sequential I/O requested from a storage system) (step 604). The method 600 injects delay commands and/or delay patterns before and/or after processing the I/O requests (step 606). The method 600 then measures the effects of those injected delays and decides/determines whether the storage system is the bottleneck of the client IO handling (step 608). In one embodiment, the measurements are performed from either the storage and/or client side. The method 600 ends (step 610).

In one embodiment, after injecting a delay command/pattern into the storage system execution, the initiated delay pattern may be compared, by a delay command/pattern matcher, to the execution of the request while allowing some level of flexibility. When a delay command/pattern is similar to the delay effect of the delay command/pattern, the delay pattern matcher's output is positive. The positive output value means that the storage system is indeed in the critical path (bottleneck) of the client application. The storage management algorithms may then use the matcher's output as a factor when deciding to change the type of processing it does to data, achieving higher performance in some common usage cases.

Figure 7:
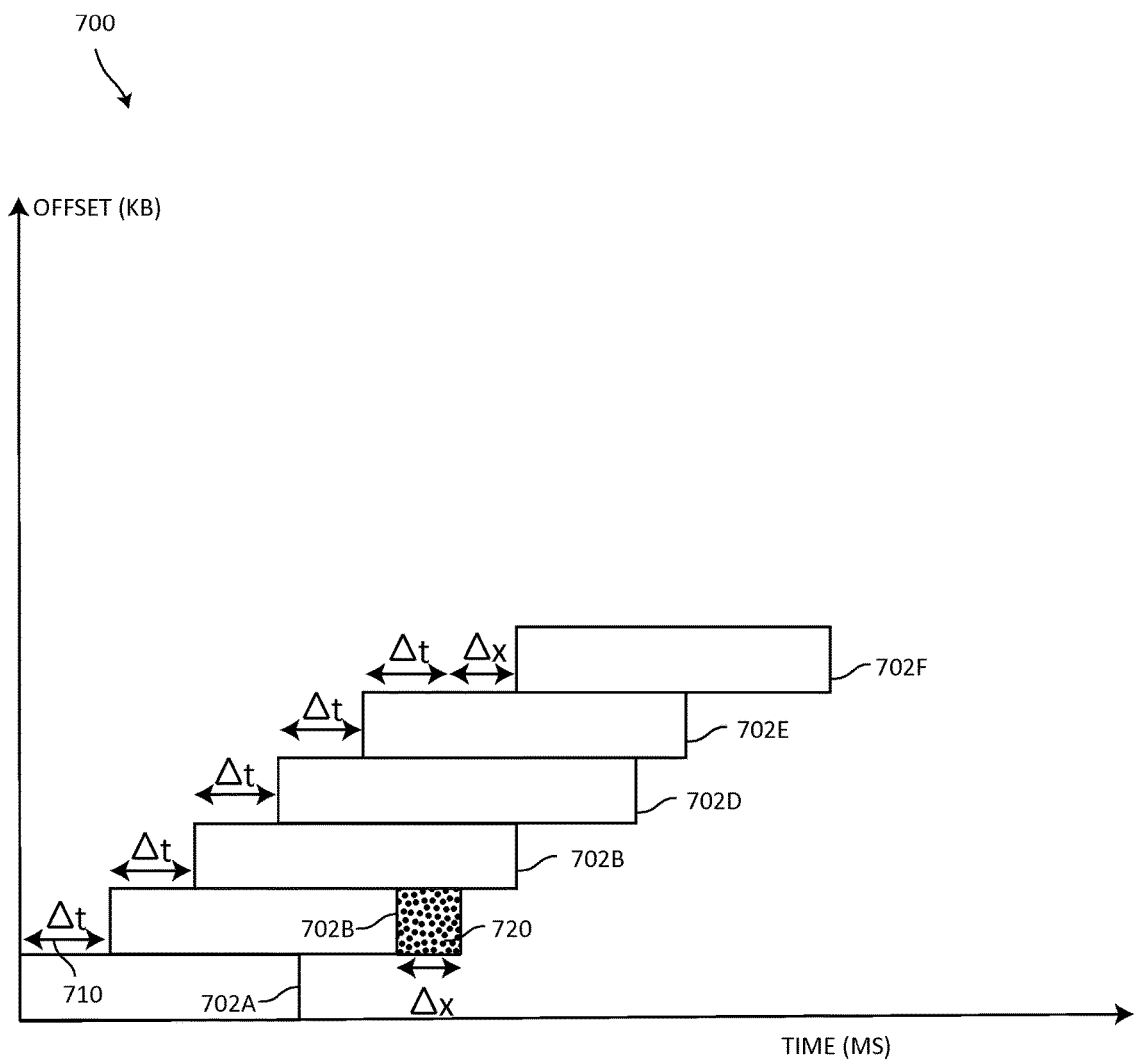
FIG. 7 illustrates an exemplary block diagram of injecting delay commands into parallel sequential input/output (I/O) requests in which aspects of the present invention may be realized.
Figure 8:
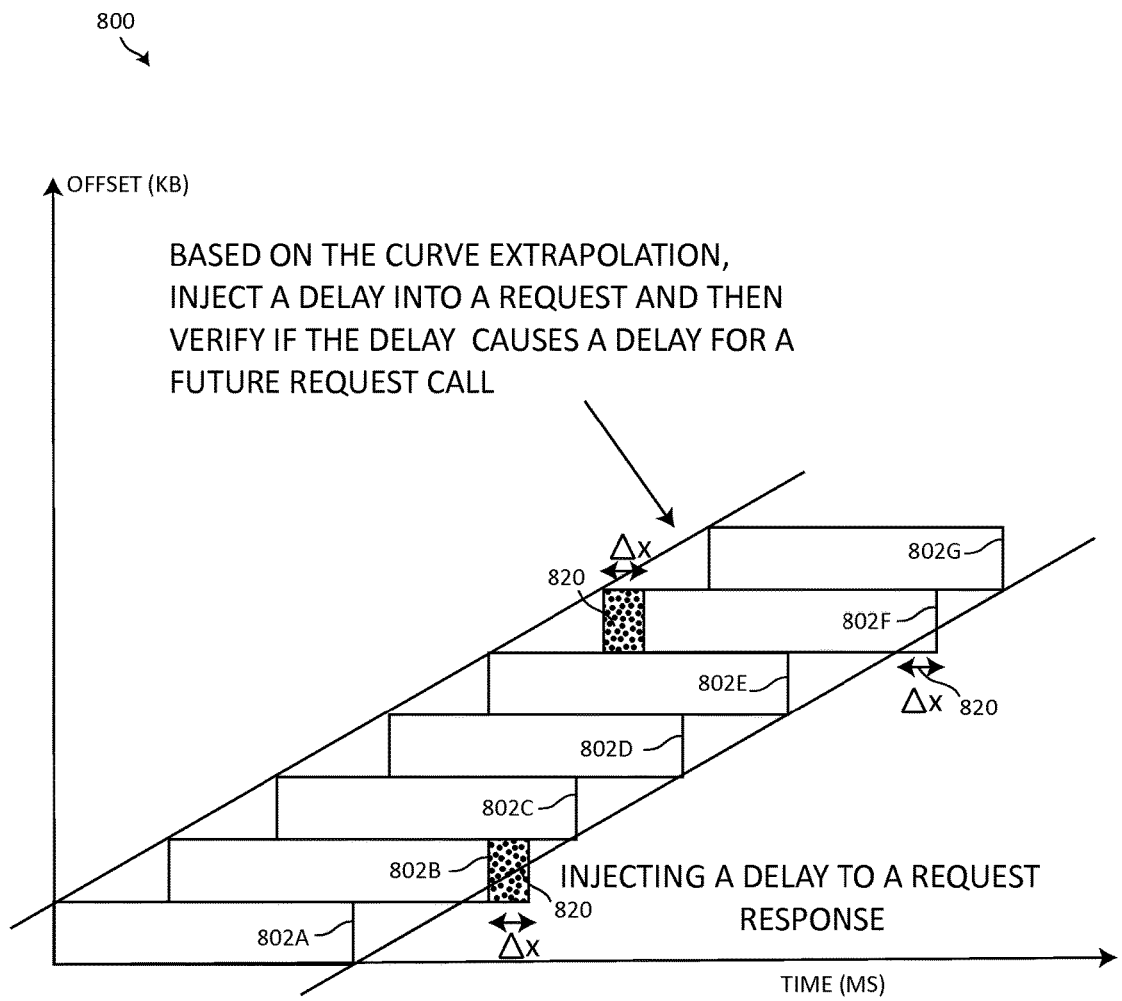
FIG. 8 illustrates an exemplary block diagram of injecting delay patterns into parallel sequential input/output (I/O) requests in which aspects of the present invention may be realized.
Figure 9:
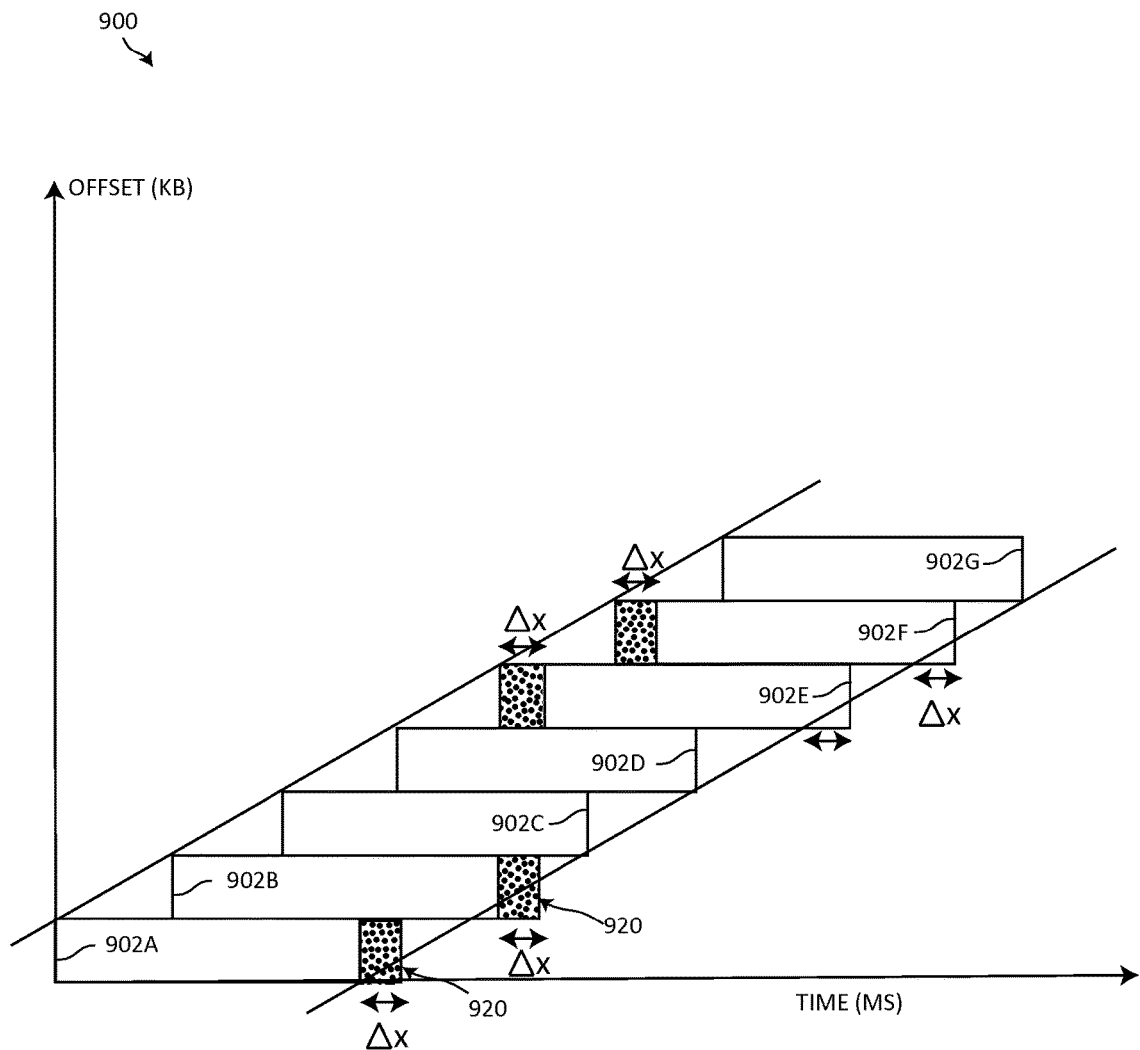
FIG. 9 illustrates an exemplary block diagram of comparing injected delay patterns into parallel sequential input/output (I/O) requests with the effect of the injected delay patterns in which aspects of the present invention may be realized.

FIG. 7 illustrates an exemplary block diagram 700 of injecting delay commands into parallel sequential input/output (I/O) requests in which aspects of the present invention may be realized. As seen in FIG. 7-9, the specified locations (offsets shown in kilobytes) are illustrated on the Y-axis and the time (e.g., milliseconds) of execution shown on the X-axis. The storage client applications may be issued as a set of sequential storage requests 702 (shown in FIG. 7 as 702A-F) in parallel. For tracking a series of sequential I/Os 702, requested from a storage system, is done by associating client IO requests with a specific sequence 702: a request writing at the end offset of a recently completed request is associated to the same IO sequence. When a tracked IO sequence is stable, the present may start injecting delays 704 (e.g., Δx). Injecting the delays 704 is carried out by simply delaying the processing by a small amount of time, and/or by alternatively delaying the response after processing. FIG. 7 illustrates how a delay 710 (e.g., Δt) in the storage response causes a delay in the client IO invocation. The effect of a delay 710 can be spotted when one of the succeeding requests 702 arrive from the client with a similar delay 710.

FIG. 8 illustrates an exemplary block diagram 800 of injecting delay patterns into parallel sequential input/output (I/O) requests in which aspects of the present invention may be realized. The injected delay 820 (e.g., Δx) effects may be detected when either the request 802F should arrive (upper Δx–820) and/or after the storage processing of the sequential storage requests 802F, the right-hand side Δx 820. Delay effects appear after a certain time, depending on the client/server communication latencies and parallelism limit. Based on the curve extrapolation, the present invention injects the delays 820 to a request 802 response and may verify if the injected delays 820 cause the delay 820 for a future request 802. The delay-effect detector should detect a delay when the delay occurs. But in order for the delay to be detected, the delay-effect detector has to know when to expect something to know it's getting delayed so the delay-effect detector expects 802F to begin or to end at a specific point. This point can be calculated by interpolation or extrapolation based on the starting and ending points of all other 802.

Moreover, the present invention delays patterns of requests, such as two consecutive requests, as depicted in FIG. 9. FIG. 9 illustrates an exemplary block diagram 900 of comparing injected delay patterns into parallel sequential input/output (I/O) requests with the effect of the injected delay patterns in which aspects of the present invention may be realized. As mentioned above, the injected delay 920 (e.g., Δx) effects may be detected when either the request 902 should arrive and/or after the storage processing of the sequential storage requests 902 (shown in FIG. 9 as 902A-G). For example, patterns may be much more complex, and may be in the form of a "binary" sequence or even real number sequence, for instance, the pattern "101101" means that the first, third, fourth, and sixth requests are delays 920. The real number sequence [0.1, 1, 0.1, 0, 1] means that the first request is delayed by 0.1 milliseconds, the next one by 1 millisecond, and so forth. As mentioned above, after injecting a delay pattern into the storage system execution, a component referred to as "delay pattern matcher" (e.g., delay pattern/command matching module) may compare the initiated delay pattern to the execution, while allowing some level of flexibility. When a delay pattern is similar to a delay effect pattern, the delay pattern matcher's output is positive. The positive output means that the storage system is indeed in the critical path (bottleneck) of the client application. The storage management algorithms may then use the matcher's output as a factor when deciding to change the type of processing it does to data, achieving higher performance in some common usage cases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for self-detecting storage bottleneck by a processor device in a computing environment, the method comprising:
   injecting delay commands into sequential input/output (I/O) requests and measuring effects of the injected delay commands for determining whether a storage system handling the sequential input/output (IO) requests is causing a bottleneck; and
   delaying a processing of the sequential I/O requests for a time period when injecting a delay command.

2. The method of claim 1, further including delaying a response after processing the sequential I/O requests for a time period when injecting a delay command.

3. The method of claim 1, further including tracking the sequential I/O requests.

4. The method of claim 3, further including performing one of:
   associating each I/O request with a specified one of the sequential I/O requests,
   requesting a write operation at an end offset of a recently completed I/O request that is associated with the specified one of the sequential I/O requests, and
   injecting delay commands into the sequential I/O requests when the sequential I/O requests that are being tracked are stable.

5. The method of claim 1, further including delaying patterns of the sequential I/O requests for a time period upon injecting the delay commands, wherein one of the patterns of the sequential I/O requests includes at least two consecutive sequential I/O requests.

6. The method of claim 1, further including performing one of:
   injecting delayed patterns into an execution of the sequential I/O requests in the storage system, and
   comparing the delayed pattern to a delayed effect pattern of the sequential I/O requests using a comparison module.

7. The method of claim 6, further including determining an output of the comparison module is positive if the delayed pattern is similar to the delayed effect pattern storage system, wherein the positive output of the comparison module indicates the storage system is a critical path causing the bottleneck.

8. The method of claim 7, further including using the positive output as a factor in determining a type of processing the storage system performs on data.

9. A system for self-detecting storage bottleneck in a computing environment, comprising:
   a storage system;
   a comparison module in association with the storage system; and
   at least one processor device, in association with the storage system and the comparison module, operable in the computing environment, wherein processor device is adapted for:
   injects delay commands into sequential input/output (I/O) requests and measuring effects of the injected delay commands for determining whether a storage system handling the sequential input/output (IO) requests is causing a bottleneck, and
   delays a processing of the sequential I/O requests for a time period when injecting a delay command.

10. The system of claim 9, wherein the at least one processor device delays a response after processing the sequential I/O requests for a time period when injecting a delay command.

11. The system of claim 9, wherein the at least one processor device tracks the sequential I/O requests.

12. The system of claim 11, wherein the at least one processor device performs one of:
   associating each I/O request with a specified one of the sequential I/O requests,
   requesting a write operation at an end offset of a recently completed I/O request that is associated with the specified one of the sequential I/O requests, and injecting delay commands into the sequential I/O requests when the sequential I/O requests that are being tracked are stable.

13. The system of claim 9, wherein the at least one processor device delays patterns of the sequential I/O requests for a time period upon injecting the delay commands, wherein one of the patterns of the sequential I/O requests includes at least two consecutive sequential I/O requests.

14. The system of claim 9, wherein the at least one processor device performs one of:
   injecting delayed patterns into an execution of the sequential I/O requests in the storage system, and
   comparing the delayed pattern to a delayed effect pattern of the sequential I/O requests using the comparison module.

15. The system of claim 14, wherein the at least one processor device determines an output of the comparison module is positive if the delayed pattern is similar to the delayed effect pattern storage system, wherein the positive output of the comparison module indicates the storage system is a critical path causing the bottleneck.

16. The system of claim 15, wherein the at least one processor device uses the positive output as a factor in determining a type of processing the storage system performs on data.

17. A computer program product for self-detecting storage bottleneck in a computing environment by a processor device, the computer program product comprising a non-transitory computer-readable storage medium having computer-readable program code portions stored therein, the computer-readable program code portions comprising:
   a first executable portion that injects delay commands into sequential input/output (I/O) requests and measuring effects of the injected delay commands for determining whether a storage system handling the sequential input/output (IO) requests is causing a bottleneck; and
   a second executable portion that delays a processing of the sequential I/O requests for a time period when injecting a delay command.

18. The computer program product of claim 17, further including a third executable portion that delays a response after processing the sequential I/O requests for a time period when injecting a delay command.

19. The computer program product of claim 17, further including a third executable portion that tracks the sequential I/O requests.

20. The computer program product of claim 19, further including a fourth executable portion that performs one of:
   associating each I/O request with a specified one of the sequential I/O requests,
   requesting a write operation at an end offset of a recently completed I/O request that is associated with the specified one of the sequential I/O requests, and
   injecting delay commands into the sequential I/O requests when the sequential I/O requests that are being tracked are stable.

21. The computer program product of claim 17, further including a third executable portion that delays patterns of the sequential I/O requests for a time period upon injecting the delay commands, wherein one of the patterns of the sequential I/O requests includes at least two consecutive sequential I/O requests.

22. The computer program product of claim 17, further including a third executable portion that performs one of:
   injecting delayed patterns into an execution of the sequential I/O requests in the storage system, and
   comparing the delayed pattern to a delayed effect pattern of the sequential I/O requests using a comparison module.

23. The computer program product of claim 22, further including a fourth executable portion that determines an output of the comparison module is positive if the delayed pattern is similar to the delayed effect pattern storage system, wherein the positive output of the comparison module indicates the storage system is a critical path causing the bottleneck.

24. The computer program product of claim 23, further including a fifth executable portion that uses the positive output as a factor in determining a type of processing the storage system performs on data.

* * * * *